US011697048B2

United States Patent
Kuntimaddi et al.

(10) Patent No.: US 11,697,048 B2
(45) Date of Patent: Jul. 11, 2023

(54) COLORED GOLF BALL AND METHOD OF MAKING SAME

(71) Applicant: Acushnet Company, Fairhaven, MA (US)

(72) Inventors: Manjari Kuntimaddi, Raynham, MA (US); Douglas E. Jones, Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 17/400,392

(22) Filed: Aug. 12, 2021

(65) Prior Publication Data

US 2023/0048448 A1  Feb. 16, 2023

(51) Int. Cl.
*A63B 37/00* (2006.01)
*B29D 99/00* (2010.01)

(52) U.S. Cl.
CPC .... *A63B 37/00495* (2020.08); *A63B 37/0076* (2013.01); *A63B 37/00223* (2020.08); *A63B 37/00376* (2020.08); *B29D 99/0042* (2013.01); *B29K 2995/002* (2013.01); *B29K 2995/0026* (2013.01)

(58) Field of Classification Search
CPC ........ A63B 37/00495; A63B 37/00223; A63B 37/00376; A63B 37/0022; A63B 37/00221; B29K 2995/002; B29K 2995/0026; B29K 2995/0018
See application file for complete search history.

(56) References Cited

U.S. PATENT DOCUMENTS

| | | | |
|---|---|---|---|
| 5,000,458 A * | 3/1991 | Proudfit | A63B 37/00223 473/378 |
| 6,083,119 A | 7/2000 | Sullivan et al. | |
| 6,146,288 A * | 11/2000 | Crast | A63B 37/00221 473/378 |
| 6,395,861 B1 | 5/2002 | Kennedy, III | |
| 6,506,851 B2 | 1/2003 | Wu | |
| 6,528,578 B2 | 3/2003 | Wu | |
| 6,610,812 B1 | 8/2003 | Wu et al. | |
| 6,939,939 B2 | 9/2005 | Slagel et al. | |
| 7,148,278 B2 | 12/2006 | Bulpett et al. | |
| 7,207,905 B2 | 4/2007 | Aoyama | |
| 7,410,429 B1 | 8/2008 | Bulpett et al. | |
| 7,537,530 B2 | 5/2009 | Bulpett et al. | |
| 7,648,428 B2 | 1/2010 | Nagasawa | |
| 7,678,877 B2 | 3/2010 | Yang et al. | |
| 7,705,075 B2 | 4/2010 | Kumar et al. | |
| 7,705,176 B2 | 4/2010 | Cholli et al. | |
| 7,705,185 B2 | 4/2010 | Kumar et al. | |
| 7,767,853 B2 | 8/2010 | Cholli et al. | |
| 7,799,948 B2 | 9/2010 | Kumar et al. | |
| 7,902,317 B2 | 3/2011 | Kumar et al. | |
| 7,923,587 B2 | 4/2011 | Cholli | |
| 7,956,153 B2 | 6/2011 | Cholli et al. | |
| 7,999,019 B2 | 8/2011 | Nakamura et al. | |
| 8,008,423 B2 | 8/2011 | Kumar et al. | |
| 8,039,673 B2 | 10/2011 | Cholli et al. | |
| 8,080,689 B2 | 12/2011 | Kumar et al. | |
| 8,242,230 B2 | 8/2012 | Cholli et al. | |
| 8,252,884 B2 | 8/2012 | Kumar et al. | |
| 8,481,670 B2 | 7/2013 | Kumar et al. | |
| 8,551,279 B2 | 10/2013 | Johnson et al. | |
| 8,598,382 B2 | 12/2013 | Cholli et al. | |
| 8,691,933 B2 | 4/2014 | Kumar et al. | |
| 8,710,266 B2 | 4/2014 | Kumar et al. | |
| 8,846,847 B2 | 9/2014 | Cholli et al. | |
| 8,927,472 B2 | 1/2015 | Cholli et al. | |
| 8,956,730 B2 | 2/2015 | Uprety et al. | |
| 8,979,669 B2 | 3/2015 | Greaney et al. | |
| 8,979,678 B2 * | 3/2015 | Hogge | A63B 43/06 473/378 |
| 9,193,675 B2 | 11/2015 | Cholli et al. | |
| 9,388,120 B2 | 7/2016 | Kumar et al. | |
| 10,035,043 B2 | 7/2018 | Hogge et al. | |
| 2002/0077197 A1 * | 6/2002 | Endo | A63B 37/00223 473/378 |
| 2003/0050425 A1 * | 3/2003 | Kennedy, III | C08G 18/7831 528/55 |
| 2008/0071016 A1 | 3/2008 | Boettcher et al. | |
| 2011/0224020 A1 | 9/2011 | Tachibana et al. | |
| 2012/0100935 A1 | 4/2012 | Michalewich et al. | |
| 2012/0286449 A1 | 11/2012 | Michalewich et al. | |
| 2013/0344991 A1 * | 12/2013 | Ladd | A63B 37/0077 473/378 |
| 2014/0018193 A1 * | 1/2014 | Morgan | A63B 37/0076 473/378 |
| 2014/0073454 A1 * | 3/2014 | Wachi | A63B 43/00 427/314 |
| 2015/0251059 A1 * | 9/2015 | Comeau | A63B 37/008 427/157 |
| 2018/0256943 A1 * | 9/2018 | Britton | A63B 37/0039 |
| 2020/0406105 A1 * | 12/2020 | Suzuki | A63B 37/00495 |
| 2022/0072386 A1 * | 3/2022 | Mochizuki | A63B 37/00376 |

FOREIGN PATENT DOCUMENTS

| | | |
|---|---|---|
| DE | 3725926 | 2/1989 |
| DE | 4406024 | 8/1995 |

(Continued)

*Primary Examiner* — John E Simms, Jr.

(57) ABSTRACT

Golf ball comprising core; casing layer; cover layer; and plurality of outer coating layers. Casing layer comprises an ionomer blend of at least one ionomer and a color concentrate resin that is included in an amount of 3-10 wt. % of the ionomer blend. Cover layer is transparent and comprises thermoplastic/thermoset urethane composition. First outer coating layer is adjacent to cover layer and comprises clear water-borne or solvent-borne primer; and second outer coating layer is adjacent to first outer coating layer and comprises gold pearl primer, white sparkle primer, or combination thereof; third outer coating layer is adjacent to second outer coating layer and comprises a clear topcoat. Alternatively, second outer coating layer comprises matte topcoat, clear glossy topcoat, or combination thereof. In all embodiments, first outer coating layer and/or second outer coating layer may be colorless.

33 Claims, No Drawings

(56) References Cited

FOREIGN PATENT DOCUMENTS

| | | |
|---|---:|---:|
| EP | 31302 | 7/1981 |
| EP | 434618 | 6/1991 |
| EP | 707002 | 4/1996 |
| GB | 2319035 | 5/1998 |
| GB | 2361005 | 10/2001 |

* cited by examiner

COLORED GOLF BALL AND METHOD OF MAKING SAME

FIELD OF THE INVENTION

The field of the invention broadly comprises golf ball constructions producing unique overall golf ball color appearances and methods of making such golf balls.

BACKGROUND OF THE INVENTION

Today, both professional and amateur golfers alike use multi-piece, solid golf balls. A single or multi-layered core is encapsulated by at least one layer such as a single or multi-layered cover layer, and optionally one or more intermediate layers may be disposed there between to complete the golf ball construction.

Golf ball manufacturers pre-select the materials for each layer to target and impart desirable golf ball performance properties. Currently, a broad range of options are available for strategically incorporating and coordinating layers within each golf ball construction. In multi-layered golf balls, each of the core, intermediate layer and cover properties, such as hardness, compression, resilience, specific gravity, outer diameter, and thickness, can be preselected and coordinated to target play characteristics such as spin, initial velocity and feel of the resulting golf ball.

Furthermore, while conventional golf balls are white, some golfers enjoy distinguishing themselves on the course by playing a golf ball having a unique visual appearance. ACCordingly, golf ball manufacturers seek to develop new golf ball constructions that produce unique overall golf ball color appearances without sacrificing durability or other desirable playing characteristics.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY OF THE INVENTION

Advantageously, golf balls of the invention have a unique overall golf ball color appearance that is created and produced collectively by a color concentrate resin of a casing layer ionomer blend and a plurality of outer coating layers. The overall golf ball color appearance is different than the color appearance of the color concentrate resin, yet the visually apparent hues of the color concentrate resin and the finished golf ball match.

In one embodiment, the golf ball comprises a core; a casing layer; a cover layer; and a plurality of outer coating layers. The core comprises one or more layers; and the casing layer comprises an ionomer blend comprising at least one ionomer and a color concentrate resin; wherein the color concentrate resin is included in an amount of from 3 wt. % to 10 wt. % of the ionomer blend. Meanwhile, the cover layer is transparent.

The golf ball has an overall golf ball color appearance having coordinates $L_{GB}^*$, $a_{GB}^*$, $b_{GB}^*$, $C_{GB}^*$, and $h_{GB}^°$ in the CIE LAB color space that are different than coordinates $L_{CC}^*$, $a_{CC}^*$, $b_{CC}^*$, $C_{CC}^*$, and $h_{CC}^°$ in the CIE LAB color space of the color concentrate resin.

In one embodiment, the plurality of outer coating layers comprises a first outer coating layer formed about an outer surface of the cover layer; a second outer coating layer formed bout an outer surface of the second coating layer; and a third outer coating layer formed about an outer surface of the second coating layer; wherein the first outer coating layer comprises a clear water-borne or clear solvent-borne primer.

In one such embodiment, the second outer coating layer comprises a gold pearl primer and the third outer coating layer comprises a clear topcoat. In a particular such embodiment, the first outer coating layer and/or the third outer coating layer may be colorless.

In another such embodiment, the second outer coating layer comprises a white sparkle primer and the third outer coating layer comprises a clear topcoat. In a particular such embodiment, the first outer coating layer and/or the third outer coating layer is colorless.

In a different embodiment, the plurality of outer coating layers comprises a first outer coating layer formed about an outer surface of the cover layer and a second outer coating layer formed about an outer surface of the first outer coating layer; wherein the first outer coating layer comprises a clear water-borne or clear solvent-borne primer.

In one such embodiment, the second outer coating layer comprises a matte topcoat. In a specific such embodiment, the first outer coating layer and/or the second outer coating layer is colorless.

In another such embodiment, the second outer coating layer comprises a clear glossy topcoat. In a specific such embodiment, the first outer coating layer and/or the second outer coating layer is colorless.

In one embodiment, the color concentrate resin is green as defined in the CIE LAB color space, and: $L_{GB}^*$, and $L_{CC}^*$ differ by greater than 25 CIE LAB color space coordinate points; and $a_{GB}^*$ and $a_{CC}^*$ differ by greater than 20 CIE LAB color space coordinate points; and $b_{GB}^*$ and $b_{CC}^*$ differ by greater than 25 CIE LAB color space coordinate points; and $C_{GB}^*$ and $C_{CC}^*$ differ by greater than 35 CIE LAB color space coordinate points; and $h_{GB}^°$ and $h_{CC}^°$ differ by at least 10.5 CIE LAB color space coordinate points.

In another embodiment, the color concentrate resin is pink as defined in the CIE LAB color space, and: $L_{GB}^*$ and $L_{CC}^*$ differ by greater than 11.50 CIE LAB color space coordinate points; and $a_{GB}^*$ and $a_{CC}^*$ differ by greater than 3 CIE LAB color space coordinate points; and $b_{GB}^*$ and $b_{CC}^*$ differ by less than 7 CIE LAB color space coordinate points; and $C_{GB}^*$ and $C_{CC}^*$ differ by up to 15 CIE LAB color space coordinate points; and $h_{GB}^°$ and the $h_{CC}^°$ differ by less than 7 CIE LAB color space coordinate points.

In yet another embodiment, the color concentrate resin is orange as defined in the CIE LAB color space, and: $L_{GB}^*$ and $L_{CC}^*$ differ by greater than 6 CIE LAB color space coordinate points; and $a_{GB}^*$ and $a_{CC}^*$ differ by greater than 7 CIE LAB color space coordinate points; and $b_{GB}^*$ and $b_{CC}^*$ differ by greater than 15 CIE LAB color space coordinate points; and $C_{GB}^*$ and $C_{CC}^*$ differ by greater than 15 CIE LAB color space coordinate points; and $h_{GB}^°$ and $h_{CC}^°$ differ by greater than 9 CIE LAB color space coordinate points.

The invention also relates to a method of making a golf ball of the invention, comprising the steps of: providing a core comprised of at least one layer; forming a casing layer about an outer surface of the core; wherein the casing layer comprises an ionomer blend of at least one ionomer and a color concentrate resin; wherein the color concentrate resin is included in an amount of from 3 wt. % to 10 wt. % of the ionomer blend; forming a transparent cover layer about an outer surface of the casing layer; and forming a plurality of outer coating layers about the cover layer.

In one embodiment, the plurality of outer coating layers comprises a first outer coating layer, a second outer coating layer, and a third outer coating layer; wherein the first outer coating layer is formed about an outer surface of the cover layer and comprises a clear water-borne or solvent-borne primer; and wherein the second outer coating layer is formed about an outer surface of the first outer coating layer and comprises a gold pearl primer; and wherein the third outer coating layer is formed about an outer surface of the second outer coating layer and comprises a clear topcoat; wherein the first outer coating layer and/or the third outer coating layer is colorless.

In another embodiment, the plurality of outer coating layers comprises a first outer coating layer, a second outer coating layer and a third outer coating layer; wherein the first outer coating layer is formed about an outer surface of the cover layer and comprises a clear water-borne or solvent-borne primer; and wherein the second outer coating layer is formed about an outer surface of the first outer coating layer and comprises a white sparkle primer; and wherein the third outer coating layer is formed about an outer surface of the second outer coating layer and comprises a clear topcoat; wherein the first outer coating layer and/or the third outer coating layer is colorless.

In yet another embodiment, the plurality of outer coating layers comprises a first outer coating layer and a second outer coating layer; wherein the first outer coating layer is formed about an outer surface of the cover layer and comprises a clear water-borne or solvent-borne primer; and wherein the second outer coating layer is formed about an outer surface of the first outer coating layer and comprises a matte topcoat; wherein the first outer coating layer and/or the second outer coating layer is colorless.

In still another embodiment, the plurality of outer coating layers comprises a first outer coating layer and a second outer coating layer; wherein the first outer coating layer is formed about an outer surface of the cover layer and comprises a clear water-borne or solvent-borne primer; and wherein the second outer coating layer is formed about an outer surface of the first outer coating layer and comprises a clear glossy topcoat; wherein the first outer coating layer and/or the second outer coating layer is colorless.

DETAILED DESCRIPTION

Golf balls of the invention have a unique overall golf ball color appearance that is created and produced collectively by a color concentrate resin of the casing layer ionomer blend and a plurality of outer coating layers. The overall golf ball color appearance is different than the color appearance of the color concentrate resin, yet the visually apparent hues of the color concentrate resin and the finished golf ball match.

In one embodiment, the golf ball comprises a core; a casing layer; a cover layer; and a plurality of outer coating layers. The core comprises one or more layers; and the casing layer comprises an ionomer blend comprising at least one ionomer and a color concentrate resin; wherein the color concentrate resin is included in an amount of from 3 wt. % to 10 wt. % of the ionomer blend.

Meanwhile, the cover layer is transparent and may comprise any known material that can be transparent such as a thermoplastic or thermoset polyurethane and/or an ionomer.

The terms "transparent" and "clear" are used herein interchangeably herein with respect to a golf ball layer/material to mean that when light encounters the layer/material, almost all of the light passes directly through the layer/material. The result is that an inner golf ball layer/material is visible through the transparent or clear layer/material. In contrast, translucent materials allow only some light to travel through them, and opaque materials allow none of the light to traverse the material.

The golf ball has an overall golf ball color appearance having coordinates $L_{GB}^*$, $a_{GB}^*$, $b_{GB}^*$, $C_{GB}^*$, and $h_{GB}^\circ$ in the CIE LAB color space that are different than coordinates $L_{CC}^*$, $a_{CC}^*$, $b_{CC}^*$, $C_{CC}^*$, and $h_{CC}^\circ$ in the CIE LAB color space of the color concentrate resin.

Such coordinates represent lightness (L*); chroma (C*); hue angle from 0° to 360° (h°); (a*) value (represents the degree of redness (positive a* to 100) and greenness (negative a* to −100); and (b*) value (represents the degree of yellowness (positive b* up to 100) and blueness (negative b* to −100) and can be measured by performing color analysis using a spectrophotometer such as the Gretag Macbeth CE 7000A which was used to measure the color coordinates of both the color concentrate resins and the overall golf ball color appearances in the aCCompanying examples.

In one embodiment, the color concentrate resin is green as defined in the CIE LAB color space, and: $L_{GB}^*$, and $L_{CC}^*$ differ by greater than 25 CIE LAB color space coordinate points; and $a_{GB}^*$ and $a_{CC}^*$ differ by greater than 20 CIE LAB color space coordinate points; and $b_{GB}^*$ and $b_{CC}^*$ differ by greater than 25 CIE LAB color space coordinate points; and $C_{GB}^*$ and $C_{CC}^*$ differ by greater than 35 CIE LAB color space coordinate points; and $h_{GB}^\circ$ and $h_{CC}^\circ$ differ by at least 10.5 CIE LAB color space coordinate points.

In another embodiment, the color concentrate resin is pink as defined in the CIE LAB color space, and: $L_{GB}^*$ and $L_{CC}^*$ differ by greater than 11.50 CIE LAB color space coordinate points; and $a_{GB}^*$ and $a_{CC}^*$ differ by greater than 3 CIE LAB color space coordinate points; and $b_{GB}^*$ and $b_{CC}^*$ differ by less than 7 CIE LAB color space coordinate points; and $C_{GB}^*$ and $C_{CC}^*$ differ by up to 15 CIE LAB color space coordinate points; and $h_{GB}^\circ$ and the $h_{CC}^\circ$ differ by less than 7 CIE LAB color space coordinate points.

In yet another embodiment, the color concentrate resin is orange as defined in the CIE LAB color space, and: $L_{GB}^*$ and $L_{CC}^*$ differ by greater than 6 CIE LAB color space coordinate points; and $a_{GB}^*$ and $a_{CC}^*$ differ by greater than 7 CIE LAB color space coordinate points; and $b_{GB}^*$ and $b_{CC}^*$ differ by greater than 15 CIE LAB color space coordinate points; and $C_{GB}^*$ and $C_{CC}^*$ differ by greater than 15 CIE LAB color space coordinate points; and $h_{GB}^\circ$ and $h_{CC}^\circ$ differ by greater than 9 CIE LAB color space coordinate points.

Meanwhile, the color concentrate resin and the finished golf ball have matching visually apparent hues—that is, both would be visually perceived by an observer as having the same predominant hue of one of green, green-yellow, blue-green, blue, violet-blue, violet, red-violet, red, orange-red, orange, yellow-orange, or yellow, etc.

The ionomer blend of the casing layer comprises a least two ionomers. At least one ionomer is blended with the color concentrate resin; wherein the color concentrate resin contains at least one other ionomer as well as a coloring agent/colorant such as a pigment, dye, tint, ink, etc.

In a particular embodiment, the ionomer blend comprises three ionomers; wherein a blend of a first ionomer and a second ionomer is combined with the color concentrate resin; wherein the color concentrate resin comprises a third ionomer. In a specific such embodiment, the third ionomer is either: (i) the same ionomer as the first ionomer or the second ionomer; or (ii) is neutralized using the same catalyst used to neutralize the first ionomer and/or the second ionomer. Of course, embodiments are envisioned wherein the third ionomer is: a different ionomer than each of the first ionomer and the second ionomer; and neutralized using a different catalyst than that used to neutralize the first ionomer and the second ionomer.

In one embodiment of a golf ball of the invention, the plurality of outer coating layers comprises a first outer coating layer formed about an outer surface of the cover layer; a second outer coating layer formed bout an outer surface of the second coating layer; and a third outer coating layer formed about an outer surface of the second coating layer; wherein the first outer coating layer comprises a clear water-borne or clear solvent-borne primer. Unless specified otherwise, a clear outer coating layer may be either clear colored or clear colorless. And the primer not only can contribute to the overall golf ball appearance but also can provide a uniform surface and facilitate adhesion between layers.

In one such embodiment, the second outer coating layer comprises a gold pearl primer, such as PPG liquid coating AQUACRON™ GOLD PEARL PRIMER, WPU66877, and the third outer coating layer comprises a clear topcoat. In a particular such embodiment, the first outer coating layer and/or the third outer coating layer is colorless.

In another such embodiment, the second outer coating layer comprises a white sparkle primer, such as PPG liquid coating AQUACRON™ WHITE SPARKLE, SPU79583, and the third outer coating layer comprises a clear topcoat. In a particular such embodiment, the first outer coating layer and/or the third outer coating layer is colorless.

In a different embodiment, the plurality of outer coating layers comprises a first outer coating layer formed about an outer surface of the cover layer and a second outer coating layer formed about an outer surface of the first outer coating layer; wherein the first outer coating layer comprises a clear water-borne or clear solvent-borne primer.

In one such embodiment, the second outer coating layer comprises a matte topcoat, such as PPG liquid coating SPECTRACRON™ MATTE TOPCOAT, SPU79583. In a specific such embodiment, the first outer coating layer and/or the second outer coating layer is colorless.

In another such embodiment, the second outer coating layer comprises a clear glossy topcoat. In a specific such embodiment, the first outer coating layer and/or the second outer coating layer is colorless.

"Glossy" and "matte" are opposing levels of glossiness of an outer coating layer finish. A glossy outer coating layer is shiny and reflects most light in the specular (mirror-like) direction; while a matte outer coating layer appears flat or without shine, most of the light diffusing in a range of angles. Gloss (or lack thereof) can be measured in aCCordance with ASTM D523 using a "gloss meter" whose receptor is sensitive to reflected light and measures the amount of light reflected back through the meter. Gloss is measured in units from 0 (no gloss) to 100 (mirror-like), with the measurement taken by reflecting light into the receptor at an industry standard of 60-degree angle. If the gloss unit number is high, the gloss is high. A gloss meter can also determine the uniformity of the gloss throughout outer coating layer.

Measurement angle refers to the angle between the incident and reflected light. Three measurement angles (20°, 60°, and 85°) are specified to cover most coatings. The angle is selected based on the anticipated gloss range of gloss units (GU): 20° for measurements expected to exceed 70 GU; 60° for measurements expected to be 10-70 GU; and 85° for measurements expected to be less than 10 GU.

For example, PPG liquid coating SPECTRACRON™ MATTE TOPCOAT, SPU79583 has low min and max gloss measurements units of 1 and 20 GU @ a measurement angle of 60°.

Thus, one or more of the casing layer and the plurality of outer coating layers may have a preselected degree of gloss (or lack thereof) which further contributes to creating/producing a unique overall golf ball color appearance apart from coordinates $L_{GB}^*$, $a_{GB}^*$, $b_{GB}^*$, $C_{GB}^*$, and $h_{GB}°$ in the CIE LAB color space being different than coordinates $L_{CC}^*$, $a_{CC}^*$, $b_{CC}^*$, $C_{CC}^*$, and $h_{CC}°$ in the CIE LAB color space of the color concentrate resin of the ionomer blend.

The invention also relates to a method of making a golf ball of the invention, comprising the steps of: providing a core comprised of at least one layer; forming a casing layer about an outer surface of the core; wherein the casing layer comprises an ionomer blend of at least one ionomer and a color concentrate resin; wherein the color concentrate resin is included in an amount of from 3 wt. % to 10 wt. % of the ionomer blend; forming a transparent cover layer about an outer surface of the casing layer; and forming a plurality of outer coating layers about the cover layer.

In one embodiment, the plurality of outer coating layers comprises a first outer coating layer, a second outer coating layer, and a third outer coating layer; wherein the first outer coating layer is formed about an outer surface of the cover layer and comprises a clear water-borne or solvent-borne primer; and wherein the second outer coating layer is formed about an outer surface of the first outer coating layer and comprises a gold pearl primer; and wherein the third outer coating layer is formed about an outer surface of the second outer coating layer and comprises a clear topcoat; wherein the first outer coating layer and/or the third outer coating layer is colorless.

In another embodiment, the plurality of outer coating layers comprises a first outer coating layer, a second outer coating layer and a third outer coating layer; wherein the first outer coating layer is formed about an outer surface of the cover layer and comprises a clear water-borne or solvent-borne primer; and wherein the second outer coating layer is formed about an outer surface of the first outer coating layer and comprises a white sparkle primer; and wherein the third outer coating layer is formed about an outer surface of the second outer coating layer and comprises a clear topcoat; wherein the first outer coating layer and/or the third outer coating layer is colorless.

In yet another embodiment, the plurality of outer coating layers comprises a first outer coating layer and a second outer coating layer; wherein the first outer coating layer is formed about an outer surface of the cover layer and comprises a clear water-borne or solvent-borne primer; and wherein the second outer coating layer is formed about an outer surface of the first outer coating layer and comprises a matte topcoat; wherein the first outer coating layer and/or the second outer coating layer is colorless.

In still another embodiment, the plurality of outer coating layers comprises a first outer coating layer and a second outer coating layer; wherein the first outer coating layer is formed about an outer surface of the cover layer and comprises a clear water-borne or solvent-borne primer; and wherein the second outer coating layer is formed about an outer surface of the first outer coating layer and comprises a clear glossy topcoat; wherein the first outer coating layer and/or the second outer coating layer is colorless.

A golf ball of the invention may be even more fully understood with reference to but not limited by the examples and aCCompanying TABLES I through V set forth below. In this regard, a total of 12 golf balls were made and overall golf ball color appearance was measured for each golf ball using a spectrophotometer color analysis device whereby color appearance is represented in terms of the coordinates $L^*$, $a^*$, $b^*$, $C^*$, and $h°$ in the CIE LAB color space.

All twelve golf balls had a diameter of 1.684 inches and each golf ball included: the same polybutadiene-based white colored core having a diameter of 1.53 inches; a casing layer having an outer diameter of 1.63 inches and formed from an ionomer blend comprising: a sodium (Na) neutralized ionomer and a lithium (Li) neutralized ionomer, in equal parts; and a color concentrate resin, in an amount of 5 wt. % of the total ionomer blend. The same clear urethane cover having a thickness of ~0.025 inches was formed about the casing layer, and at least two pre-selected outer coating layers, each having a thickness of ~0.001 inches, were formed about the cover layer.

Meanwhile, each four of twelve golf balls are distinguishable with respect to the preselected color of the color concentrate resin incorporated in the ionomer blend of the casing layer. Specifically, four golf balls G included the same green concentrate resin, four other golf balls P included the same pink concentrate resin, and four more golf balls O included the same orange concentrate resin.

Color concentrate resin was premeasured and provided in pellet form for each of the twelve golf balls; wherein four pellets comprised the green concentrate resin, four pellets comprised pink concentrate resin, and four pellets comprised orange concentrate resin. Prior to combining each pellet with the sodium (Na) neutralized ionomer and a lithium (Li) neutralized ionomer to form the ionomer blend of the casing layer, each pellet of color concentrate resin was evaluated and measured for color coordinates $L_{CC}^*$, $a_{CC}^*$, $b_{CC}^*$, $C_{CC}^*$ and $h_{CC}°$ by placing a given pellet into a Gretag Macbeth CE 7000A spectrophotometer and applying a filter of illuminant D65 with a 10° standard observer (denoted in each table by the subscript "ca"). The results appear in TABLE I as follows:

TABLE 1

| Casing Concentrate | $L_{CC}^*$ | $a_{CC}^*$ | $b_{CC}^*$ | $C_{CC}^*$ | $h_{CC}°$ |
|---|---|---|---|---|---|
| Gca | 57.76 | −10.24 | 28.07 | 29.88 | 110.05 |
| Pca | 58.50 | 52.25 | 6.23 | 52.62 | 6.80 |
| Oca | 52.51 | 40.53 | 20.62 | 45.47 | 26.96 |

Each four of twelve golf balls are even further distinguishable with respect to the preselected outer coating layer system applied as follows. One golf ball within each group G, P and O, bearing the subscript "1" (see TABLES II, III and IV below), incorporated an outer coating layer system wherein a first outer coating layer of clear water-borne primer was formed about the cover; a second outer coating layer of gold pearl primer (PPG liquid coating AQUACRON™ GOLD PEARL PRIMER, WPU66877) was formed about the first outer coating layer; and a third outer coating layer of clear colorless topcoat was formed about the second outer coating layer. One golf ball within each group G, P and O, bearing the subscript "2", incorporated an outer coating layer system wherein a first outer coating layer of clear water-borne primer was formed about the cover; a second outer coating layer of white sparkle primer (PPG liquid coating AQUACRON™ WHITE SPARKLE, SPU79583) was formed about the first outer coating layer; and a third outer coating layer of clear colorless topcoat was formed about the second outer coating layer. One golf ball within each group G, P and O, bearing the subscript "3", incorporated an outer coating layer system wherein a first outer coating layer of clear colorless water-borne primer was formed about the cover; and a second outer coating layer of matte topcoat (PPG liquid coating SPECTRACRON™ MATTE TOPCOAT, SPU79583) was formed about the first outer coating layer. Finally, one golf ball within each group G, P and O, bearing the subscript "4", incorporated an outer coating layer system wherein a first outer coating layer of clear water-borne primer was formed about the cover; and a second outer coating layer of clear glossy topcoat was formed about the first outer coating layer.

Additionally, for golf balls bearing the subscript "1", localized black UV print was provided on the surface of gold pearl primer outer coating layer prior to forming the third outer coating layer of clear colorless topcoat thereabout. Meanwhile, for golf balls bearing the subscript "2", localized black UV print was provided on the surface of the white sparkle primer outer coating layer prior to forming the third outer coating layer of clear colorless topcoat thereabout. Moreover, for golf balls bearing the subscript "3", localized black UV print was provided on the surface of the clear colorless water-borne primer prior to forming the matte topcoat thereabout. Finally, for golf balls bearing the subscript "3", localized black UV print was provided on the surface of the clear colorless water-borne primer prior to forming the clear glossy topcoat thereabout.

All outer coating layers were applied using the same spray gun system. Spray gun settings such as spray gun pressure, atomization pressure and nozzle-to-golf ball distance were preselected for each given outer coating layer material depending, for example, on the dispense time as well as on the degree of coverage desired on the golf ball and also depending the viscosity of the particular outer coating being used/applied. For example, spray gun pressure was in the range of about 15-60 psi, atomization pressure was in the range of about 10-80 psi, and nozzle-to-golf ball distance was in the range of about 1.5 to 10.5 inches, again, with the limitation being that a preselected setting was the same for each golf ball being coated with the given coating material.

The overall golf ball color appearances of the 12 finished golf balls were measured via color analysis by placing each golf ball in the Gretag Macbeth CE 7000A spectrophotometer and taking three color coordinates measurements for each of the twelve finished golf balls without excluding UV light (under illuminant D65, with a 10° standard observer). These measurements appear in TABLES II, III and IV below as $G_{1a}$, $G_{2a}$, $G_{3a}$, $G_{4a}$; $P_{1a}$, $P_{2a}$, $P_{3a}$, $P_{4a}$, and $O_{1a}$, $O_{2a}$, $O_{3a}$, $O_{4a}$.

In addition, three color coordinates measurements were taken for each of the twelve finished golf balls excluding UV light, the measurements being represented in TABLES II, III and IV as $G_{1b}$, $G_{2b}$, $G_{3b}$, $G_{4b}$; $P_{1b}$, $P_{2b}$, $P_{3b}$, $P_{4b}$; and $O_{1b}$, $O_{2b}$, $O_{3b}$, $O_{4b}$.

Specifically, TABLE II identifies the $L_{GB}^*$, $a_{GB}^*$, $b^*$, $C_{GB}^*$ and $h_{GB}°$ measurements taken under illuminant D65, with a 10° standard observer as well as when excluding UV light for golf balls having a casing layer including the green color concentrate resin of TABLE I and the four outer coating layer systems as follows:

TABLE II

| Example | $L_{GB}^*$ | $a_{GB}^*$ | $b_{GB}^*$ | $C_{GB}^*$ | $h_{GB}°$ |
|---|---|---|---|---|---|
| $G_{1a}$ | 86.73 | −42.01 | 66.20 | 78.40 | 122.40 |
| $G_{1a}$ | 87.72 | −43.29 | 70.09 | 82.38 | 121.70 |

TABLE II-continued

| Example | $L_{GB}*$ | $a_{GB}*$ | $b*$ | $C_{GB}*$ | $h_{GB}°$ |
|---|---|---|---|---|---|
| $G_{1a}$ | 86.64 | −42.61 | 67.40 | 79.74 | 122.30 |
| $G_{2a}$ | 85.95 | −38.86 | 50.10 | 63.41 | 127.80 |
| $G_{2a}$ | 87.16 | −41.06 | 54.17 | 67.97 | 127.17 |
| $G_{2a}$ | 87.83 | −40.37 | 50.63 | 67.13 | 126.97 |
| $G_{3a}$ | 88.25 | −47.76 | 74.56 | 88.55 | 122.65 |
| $G_{3a}$ | 87.65 | −48.74 | 75.69 | 90.02 | 122.78 |
| $G_{3a}$ | 86.73 | −45.89 | 67.27 | 81.43 | 124.30 |
| $G_{4a}$ | 87.22 | −47.31 | 73.19 | 87.15 | 122.88 |
| $G_{4a}$ | 86.99 | −47.24 | 72.20 | 86.29 | 123.20 |
| $G_{4a}$ | 87.41 | −48.25 | 75.55 | 89.65 | 122.56 |
| $G_{1b}$ | 86.19 | −41.78 | 72.79 | 83.92 | 119.86 |
| $G_{1b}$ | 85.42 | −41.18 | 70.38 | 81.54 | 120.33 |
| $G_{1b}$ | 85.26 | −40.44 | 68.87 | 79.87 | 120.42 |
| $G_{1b}$ | 85.51 | −38.35 | 53.92 | 66.17 | 125.42 |
| $G_{2b}$ | 84.66 | −37.47 | 51.34 | 63.56 | 126.13 |
| $G_{2b}$ | 85.83 | −40.45 | 58.55 | 71.16 | 124.64 |
| $G_{3b}$ | 86.16 | −46.79 | 77.89 | 90.86 | 121.00 |
| $G_{3b}$ | 85.20 | −44.44 | 70.93 | 83.71 | 122.07 |
| $G_{3b}$ | 86.47 | −45.47 | 76.13 | 88.68 | 120.85 |
| $G_{4b}$ | 85.51 | −45.68 | 76.39 | 89.01 | 120.88 |
| $G_{4b}$ | 85.42 | −45.48 | 75.72 | 88.33 | 120.99 |
| $G_{4b}$ | 85.62 | −46.25 | 77.68 | 90.41 | 120.77 |

In turn, TABLE III identifies the $L_{GB}*$, $a_{GB}*$, $b*$, $C_{GB}*$ and $h_{GB}°$ measurements taken under illuminant D65, with a 10° standard observer as well as when excluding UV light) for golf balls having a casing layer including the pink color concentrate resin of TABLE I and the four outer coating layer systems as follows:

TABLE III

| Example | $L_{GB}*$ | $a_{GB}*$ | $b*$ | $C_{GB}*$ | $h_{GB}°$ |
|---|---|---|---|---|---|
| $P_{1a}$ | 72.84 | 48.81 | 4.25 | 48.99 | 4.97 |
| $P_{1a}$ | 72.37 | 50.89 | 3.36 | 51.00 | 3.77 |
| $P_{1a}$ | 72.71 | 50.11 | 3.59 | 50.24 | 4.10 |
| $P_{2a}$ | 74.10 | 44.98 | −0.28 | 44.98 | 359.65 |
| $P_{2a}$ | 74.30 | 46.61 | −0.11 | 46.61 | 359.86 |
| $P_{2a}$ | 73.49 | 48.41 | 0.50 | 48.41 | 0.59 |
| $P_{3a}$ | 71.29 | 57.86 | 0.87 | 57.86 | 0.87 |
| $P_{3a}$ | 71.75 | 60.07 | 1.90 | 60.10 | 1.81 |
| $P_{3a}$ | 69.46 | 58.31 | 2.25 | 58.35 | 2.21 |
| $P_{4a}$ | 70.35 | 57.10 | 0.73 | 57.10 | 0.74 |
| $P_{4a}$ | 70.31 | 56.46 | 0.07 | 56.46 | 0.07 |
| $P_{4a}$ | 70.74 | 56.84 | 0.08 | 56.84 | 0.08 |
| $P_{1b}$ | 72.3 | 47.97 | 8.16 | 48.66 | 9.65 |
| $P_{1b}$ | 71.71 | 50.31 | 7.61 | 50.88 | 8.60 |
| $P_{1b}$ | 71.90 | 49.43 | 7.40 | 49.98 | 8.51 |
| $P_{2b}$ | 73.45 | 44.14 | 3.36 | 44.27 | 4.35 |
| $P_{2b}$ | 73.85 | 44.59 | 3.56 | 45.73 | 4.47 |
| $P_{2b}$ | 73.34 | 47.06 | 4.31 | 47.26 | 5.24 |
| $P_{3b}$ | 70.90 | 56.91 | 5.18 | 57.15 | 5.20 |
| $P_{3b}$ | 71.17 | 59.10 | 6.19 | 59.42 | 5.98 |
| $P_{3b}$ | 69.10 | 57.93 | 6.89 | 58.34 | 6.78 |
| $P_{4b}$ | 69.26 | 55.94 | 4.97 | 56.16 | 5.08 |
| $P_{4b}$ | 69.81 | 55.44 | 4.66 | 55.63 | 4.80 |
| $P_{4b}$ | 70.17 | 55.98 | 4.70 | 56.17 | 4.80 |

Moreover, TABLE IV identifies the $L_{GB}*$, $a_{GB}*$, $b*$, $C_{GB}*$ and $h_{GB}°$ measurements taken under illuminant D65, with a 10° standard observer as well as when excluding UV light for golf balls having a casing layer including the orange color concentrate resin of TABLE I and the four outer coating layer systems as follows:

TABLE IV

| Example | $L_{GB}*$ | $a_{GB}*$ | $b_{GB}*$ | $C_{GB}*$ | $h_{GB}°$ |
|---|---|---|---|---|---|
| $O_{1a}$ | 71.90 | 51.87 | 54.43 | 75.19 | 46.38 |
| $O_{1a}$ | 73.43 | 50.98 | 55.24 | 75.17 | 47.30 |

TABLE IV-continued

| Example | $L_{GB}*$ | $a_{GB}*$ | $b_{GB}*$ | $C_{GB}*$ | $h_{GB}°$ |
|---|---|---|---|---|---|
| $O_{1a}$ | 71.23 | 52.23 | 54.39 | 75.41 | 46.16 |
| $O_{2a}$ | 73.83 | 51.18 | 39.46 | 64.62 | 37.63 |
| $O_{2a}$ | 73.40 | 48.53 | 34.91 | 59.78 | 35.73 |
| $O_{2a}$ | 72.01 | 46.89 | 32.74 | 57.19 | 34.92 |
| $O_{3a}$ | 69.90 | 60.71 | 60.51 | 85.72 | 44.90 |
| $O_{3a}$ | 69.89 | 61.90 | 62.36 | 87.87 | 45.21 |
| $O_{3a}$ | 69.74 | 61.26 | 60.64 | 86.20 | 44.71 |
| $O_{4a}$ | 69.88 | 59.26 | 58.44 | 83.23 | 44.60 |
| $O_{4a}$ | 69.31 | 59.57 | 58.19 | 83.28 | 44.33 |
| $O_{4a}$ | 69.18 | 59.05 | 58.13 | 82.86 | 44.55 |
| $O_{1b}$ | 71.26 | 51.36 | 58.46 | 77.82 | 48.70 |
| $O_{1b}$ | 72.43 | 50.10 | 58.15 | 76.76 | 49.25 |
| $O_{1b}$ | 70.33 | 50.81 | 57.47 | 76.71 | 48.52 |
| $O_{2b}$ | 72.60 | 51.86 | 44.96 | 68.64 | 40.93 |
| $O_{2b}$ | 72.73 | 47.72 | 37.07 | 60.42 | 37.84 |
| $O_{2b}$ | 71.20 | 46.07 | 35.11 | 57.92 | 37.31 |
| $O_{3b}$ | 68.69 | 59.67 | 64.33 | 87.74 | 47.15 |
| $O_{3b}$ | 68.70 | 60.92 | 66.39 | 90.10 | 47.46 |
| $O_{3b}$ | 68.55 | 60.45 | 64.95 | 88.73 | 47.05 |
| $O_{4b}$ | 69.13 | 58.86 | 63.58 | 86.64 | 47.21 |
| $O_{4b}$ | 68.25 | 58.83 | 62.64 | 85.93 | 46.80 |
| $O_{4b}$ | 68.32 | 59.16 | 63.89 | 87.08 | 47.20 |

Finally, TABLE V identifies an average of the three $L_{GB}*$, $a_{GB}*$, $b_{GB}*$, $C_{GB}*$ and $h_{GB}°$ measurements taken for each of the twelve golf balls as follows:

TABLE V

| Example | $L_{GB}*$ Ave | $a_{GB}*$ Ave | $b_{GB}*$ Ave | $C_{GB}*$ Ave | $h_{GB}°$ Ave |
|---|---|---|---|---|---|
| $G_{1a}$ | 87.03 | −42.64 | 67.89 | 80.17 | 122.13 |
| $G_{2a}$ | 86.98 | −40.11 | 52.64 | 66.18 | 127.31 |
| $G_{3a}$ | 87.55 | −47.47 | 72.43 | 86.60 | 123.24 |
| $G_{4a}$ | 87.21 | −47.60 | 73.64 | 87.68 | 122.88 |
| $G_{1b}$ | 85.62 | −41.14 | 70.67 | 81.77 | 120.20 |
| $G_{2b}$ | 85.33 | −38.76 | 54.56 | 66.93 | 125.39 |
| $G_{3b}$ | 85.95 | −45.57 | 74.94 | 87.71 | 121.30 |
| $G_{4b}$ | 85.52 | −45.80 | 76.59 | 89.24 | 120.88 |
| $P_{1a}$ | 72.664 | 49.94 | 3.73 | 50.07 | 4.27 |
| $P_{2a}$ | 73.96 | 46.66 | 0.03 | 46.66 | 0.04 |
| $P_{3a}$ | 70.85 | 58.75 | 1.67 | 58.77 | 1.63 |
| $P_{4a}$ | 70.47 | 56.80 | 0.29 | 56.80 | 0.29 |
| $P_{1b}$ | 71.97 | 49.23 | 7.72 | 49.84 | 8.91 |
| $P_{2b}$ | 73.55 | 45.60 | 3.74 | 45.75 | 4.69 |
| $P_{3b}$ | 70.40 | 57.98 | 6.07 | 58.30 | 5.98 |
| $P_{4b}$ | 69.75 | 55.79 | 4.78 | 55.99 | 4.89 |
| $O_{1a}$ | 72.20 | 51.68 | 54.69 | 75.25 | 46.62 |
| $O_{2a}$ | 73.09 | 48.89 | 35.69 | 60.54 | 36.13 |
| $O_{3a}$ | 69.84 | 61.29 | 61.16 | 86.59 | 44.94 |
| $O_{4a}$ | 69.46 | 59.29 | 58.25 | 83.12 | 44.49 |
| $O_{1b}$ | 71.35 | 50.75 | 58.02 | 77.09 | 48.83 |
| $O_{2b}$ | 72.18 | 48.58 | 38.94 | 62.26 | 38.71 |
| $O_{3b}$ | 68.65 | 60.35 | 65.21 | 88.85 | 47.22 |
| $O_{4b}$ | 68.57 | 58.95 | 63.37 | 86.55 | 47.07 |

ACCordingly, it is evident from TABLES I-V and aCCompanying disclosure herein that golf balls of the invention have unique color appearances that are produced by incorporating a preselected color concentrate resin in the casing layer ionomer blend and meanwhile also including a unique outer coating layer system which collectively produce the unique overall golf ball color appearance. The color concentrate resin of the casing layer ionomer blend has preselected color coordinates $L_{CC}*$, $a_{CC}*$, $b_{CC}*$, $C_{CC}*$ and $h_{CC}°$ in the CIE LAB color space which, combined with a preselected outer coating layer system as defined herein, creates/produces a unique overall golf ball color appearance having color coordinates $L_{GB}*$, $a_{GB}*$, $b_{GB}*$, $C_{GB}*$, and $h_{GB}°$ in the CIE LAB color space that that are different than color coordinates $L_{CC}*$, $a_{CC}*$, $b_{CC}*$, $C_{CC}*$ and $h_{CC}°$ yet do not change the visually apparent hue of the color concentrate resin.

That is, the color concentrate resin and the finished golf ball have matching visually apparent hues in that both would be visually perceived by an observer as having the same predominant hue of one of green, green-yellow, blue-green, blue, violet-blue, violet, red-violet, red, orange-red, orange, yellow-orange, or yellow, etc., and yet the resulting golf ball of the invention has a unique overall golf ball color appearance comprised of color coordinates $L_{GB}^*$, $a_{GB}^*$, $b_{GB}^*$, $C_{GB}^*$, and $h_{GB}°$ in the CIE LAB color space that are different than color coordinates $L_{CC}^*$, $a_{CC}^*$, $b_{CC}^*$, $C_{CC}^*$ and $h_{CC}°$ of its respective color coordinate.

Logo(s) or other print such as UV print may be provided on any of the outer surface of the cover layer or the outer surface of any of the coating layers of a golf ball of the invention.

Embodiments are envisioned wherein an outer coating layer applied/provided on the subassembly may be solvent-borne, water-borne and/or powdered.

Embodiments are envisioned wherein any known additional color effects may be added to or included in the casing layer ionomer blend and/or the outer coating layer system as desired.

A golf ball of the invention may have any known construction, with the limitations being that the golf ball comprises a core; a casing layer; a cover layer; and a plurality of outer coating layers; wherein the casing layer comprises an ionomer blend of at least one ionomer and a color concentrate resin that is included in an amount of 3-10 wt. % of ionomer blend; wherein the cover layer is transparent. Meanwhile, a first outer coating layer is adjacent to the cover layer and comprises a clear water-borne or solvent-borne primer; and one of the following additional coatings is applied: a second outer coating layer is adjacent to first outer coating layer and comprises gold pearl primer, white sparkle primer, or combination thereof; third outer coating layer is adjacent to second outer coating layer and comprises a clear topcoat; or alternatively, a second outer coating layer comprises matte topcoat, clear glossy topcoat, or combination thereof. In all embodiments, the first outer coating layer and/or outermost coating layer may be colorless.

Otherwise, many different types of ball constructions are envisioned. For example, in a specific embodiment, the golf ball may include a core having a diameter of about 1.53 inches, a casing having an outer diameter of about 1.63 inches, a cover having an outer diameter of from about 0.025-0.027 inches, and a plurality of outer coating layers, each having a thickness of from about 1 mil. to about 1.5 mils.

Apart from the limitations set forth herein, golf balls of the invention may contain any number of other layers comprising any known composition. For example, such other layers of the golf ball may be formed from thermoset, thermoplastic, castable or non-castable polyurethanes, polyureas, polyurethane/polyurea hybrids, ionomer resins, balata, or any other suitable layer material known to those skilled in the art.

In general, the hardness, diameter, and thickness of the different ball layers may vary depending upon the desired ball construction. Thus, golf balls of the invention may have any known overall diameter and any known number of different layers and layer thicknesses to target desired playing characteristics. The outer coating layers may have any known thickness that can be so applied or otherwise provided. For example, each coating layer may have a thickness of from about 0.1 µm to about 50 µm, or from about 0.1 µm to about 25 µm, or from about 0.1 µm to about 14 µm, or from about 2 µm to about 9 µm, or from 25 µm to about 40 µm, for example. Or, one or more such inventive coating layers may be formed about the outer surface of a cover or other subassembly and have a combined thickness of from about 0.1 µm to about 100 µm, or from about 2 µm to about 50 µm, or from about 2 µm to about 30 µm.

Each of the following co-owned patents/publications is hereby incorporated by reference herein in its entirety: U.S. Pat. Nos. 11,040,250, 10,933,285, 10,596,419, 10,016,659, 10,661,123, 10,967,225, 10,821,327, 10,252,113, 10,918, 912, 10,814,180, 10,773,129, 10,682,553, 10,500,444, 10,500,443, 10,427,004, 10,119,008, 10,105,576, 10,105, 575, 10,933,285, 10,933,285, 10,933,285, 10,933,285, 10,933,285, and U.S. Publ. No. 2021/0094209. For example, non-limiting examples of suitable golf ball compositions as well as non-limiting examples of suitable methods for making golf balls of the invention are disclosed therein.

It is also envisioned that one or more additional coating layers (clear, clear-colored, and/or translucent) may be applied about an outer surface of a layer of a golf ball of the invention to further develop the unique overall golf ball color appearance.

In golf balls of the invention, the surface/substrate/layer onto and about which the coating layer is formed may comprise any known golf ball material such as but not limited to rubbers, ionomers, HNPs, polyurethanes (thermoset, thermoplastic), polyureas, polyurethane/polyurea hybrids, polybutadienes, plasticized thermoplastics, polyalkenamer compositions, polyester-based thermoplastic elastomers containing plasticizers, transparent or plasticized polyamides, thiolene compositions, poly-amide and anhydride-modified polyolefins, organic acid-modified polymers, and the like.

Otherwise, a novel golf ball produced by a method of the invention may include a core, casing layer, cover layer and a plurality of outer coating layers, although embodiments are indeed envisioned wherein the outer coating layer serves as an inner layer such as an intermediate and/or inner cover layer and/or outer cover layer.

That being said, a core in a golf ball of the invention may be a single core or be multi-layered. For example, a multi-layer core may comprise an inner core (sometimes also referred to as a center or spherical inner core) and an outer core layer and may even have one or more intermediate core layers disposed between an inner core and outer core layer.

The core often comprises rubber, although embodiments are indeed envisioned wherein any material known in the golf ball art may be used in the core to target desired golf ball properties and playing characteristics. Thus, materials typically used as an intermediate layer or an outermost cover layer may sometimes be used as a core material.

Thus, the cores and core layers of golf balls of the invention may have various hardnesses and hardness gradients as known in the golf ball art depending on the particular golf ball playing characteristics being targeted. The inner core and/or outer core layer hardness can range, for example, from 35 Shore C to about 98 Shore C, or 50 Shore C to about 90 Shore C, or 60 Shore C to about 85 Shore C, or 45 Shore C to about 75 Shore C, or 40 Shore C to about 85 Shore C. In other embodiments, inner core and/or outer core layer hardness can range, for example, from about 20 Shore D to about 78 Shore D, or from about 30 Shore D to about 60 Shore D, or from about 40 Shore D to about 50 Shore D, or 50 Shore D or less, or greater than 50 Shore D.

Of course, advantageously, a resulting golf ball of the invention created using the method of the invention may have any known hardness gradient and in any known hardness scale in the golf ball art such as Shore C, Shore D, Shore M, etc.

A positive hardness gradient having a magnitude of from about 1 to about 7 Shore C hardness points generally defines a shallow positive hardness gradient. A positive hardness gradient having a magnitude of greater than about 7 to about 22 Shore C hardness points generally defines a "medium" positive hardness gradient. In turn, positive hardness gradient having a magnitude of more than about 22 Shore C hardness points generally defines a "steep" positive hardness gradient.

A hardness gradient having a magnitude within +1 or −1 Shore C hardness point is generally considered to define a "zero" hardness gradient.

And an outer surface hardness (solid inner core/outer core layer) that is less than the respective geometric center hardness/inner surface hardness by more than about 1 Shore C hardness point is generally considered to define a negative hardness gradient.

The golf balls of the present disclosure may be formed using a variety of application techniques. For example, the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials.

Golf balls of the invention may have any known dimple count. The dimple count on the golf balls contemplated by the present disclosure may be varied. As used herein, the "dimple count" of a golf ball refers to how many dimples are present on the golf ball. The total number of dimples may be based on, for instance, the number of differently sized dimples, the maximum and minimum diameters of the dimples, the dimple arrangement, and the desired surface coverage.

Test Methods

Hardness. Thermoset and thermoplastic layers herein may be treated in such a manner as to create a positive or negative hardness gradient within and between golf ball layers. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference. Property gradients such as a hardness gradient can be created between golf ball layers. The center hardness of a core may be obtained aCCording to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result.

The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches.

Leaving the core in the holder, the center of the core is found with a center square and carefully marked and the hardness is measured at the center mark aCCording to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined aCCording to the test procedures provided above. The outer surface of the inner core layer (or other optional intermediate core layers) in a dual-core ball are also readily determined aCCording to the procedures given herein for measuring the outer surface hardness of a golf ball layer if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured aCCording to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured aCCording to the test method ASTM D-2240.

Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five suCCessive increases in load are detected during the initial phase of the test. The SCDI is a slight variation of this set up. The hardware is the same, but the software and output has changed. With the SCDI, the interest is in the pounds of force required to deflect a core x amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Coefficient of Restitution ("COR"). The COR is determined aCCording to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

Mooney Viscosity. The measurement of Mooney viscosity is defined aCCording to ASTM D-1646.

For each embodiment of a golf ball and/or method of the invention disclosed herein, alternative embodiments are indeed also envisioned wherein "comprises" (e.g., "comprise", "comprised of", "comprising", etc.) may be replaced with "consists essentially of" (e.g., "consist essentially of", "consisting essentially of", etc.) and/or "consists of" (e.g., "consist of", "consisting of", etc.).

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A golf ball comprising: a core; a casing layer; a cover layer; and a plurality of outer coating layers;
wherein the casing layer comprises an ionomer blend comprising at least one ionomer and a color concentrate resin; wherein the color concentrate resin is included in an amount of from 3 wt. % to 10 wt. % of the ionomer blend; and
wherein the cover layer is transparent;
wherein the golf ball has an overall golf ball color appearance having coordinates $L_{GB}^*$, $a_{GB}^*$, $b_{GB}^*$, $C_{GB}^*$, and $h_{GB}°$ in the CIE LAB color space that are different than coordinates $L_{CC}^*$, $a_{CC}^*$, $b_{CC}^*$, $C_{CC}^*$, and $h_{CC}°$ in the CIE LAB color space of the color concentrate resin; and
wherein the color concentrate resin is green as defined in the CIE LAB color space, and:
$L_{GB}^*$, and $L_{CC}^*$ differ by greater than 25 CIE LAB color space coordinate points; and
$a_{GB}^*$, and $a_{CC}^*$ differ by greater than 20 CIE LAB color space coordinate points; and
$b_{GB}^*$, and $b_{CC}^*$ differ by greater than 25 CIE LAB color space coordinate points; and
$C_{GB}^*$, and $C_{CC}^*$ differ by greater than 35 CIE LAB color space coordinate points; and
$h_{GB}°$, and $h_{CC}°$ differ by at least 10.5 CIE LAB color space coordinate points.

2. The golf ball of claim 1, wherein the plurality of outer coating layers comprises a first outer coating layer formed about an outer surface of the cover layer; a second outer coating layer formed about an outer surface of the first outer coating layer; and a third outer coating layer formed about an outer surface of the second outer coating layer; wherein the first outer coating layer comprises a clear water-borne or clear solvent-borne primer.

3. The golf ball of claim 2, wherein the second outer coating layer comprises a gold pearl primer and the third outer coating layer comprises a clear topcoat.

4. The golf ball of claim 3, wherein the first outer coating layer and/or the third outer coating layer is colorless.

5. The golf ball of claim 2, wherein the second outer coating layer comprises a white sparkle primer and the third outer coating layer comprises a clear topcoat.

6. The golf ball of claim 5, wherein the first outer coating layer and/or the third outer coating layer is colorless.

7. The golf ball of claim 1, wherein the plurality of outer coating layers comprises a first outer coating layer formed about an outer surface of the cover layer; and a second outer coating layer formed about an outer surface of the first outer coating layer; wherein the first outer coating layer comprises a clear water-borne or clear solvent-borne primer.

8. The golf ball of claim 7, wherein the second outer coating layer comprises a matte topcoat.

9. The golf ball of claim 8, wherein the first outer coating layer and/or the second outer coating layer is colorless.

10. The golf ball of claim 7, wherein the second outer coating layer comprises a clear glossy topcoat.

11. The golf ball of claim 10, wherein the first outer coating layer and/or the second outer coating layer is colorless.

12. A golf ball comprising: a core; a casing layer; a cover layer; and a plurality of outer coating layers;
wherein the casing layer comprises an ionomer blend comprising at least one ionomer and a color concentrate resin; wherein the color concentrate resin is included in an amount of from 3 wt. % to 10 wt. % of the ionomer blend; and
wherein the cover layer is transparent;
wherein the golf ball has an overall golf ball color appearance having coordinates $L_{GB}^*$, $a_{GB}^*$, $b_{GB}^*$, $C_{GB}^*$, and $h_{GB}°$ in the CIE LAB color space that are different than coordinates $L_{CC}^*$, $a_{CC}^*$, $b_{CC}^*$, $C_{CC}^*$, and $h_{CC}°$ in the CIE LAB color space of the color concentrate resin; and
wherein the color concentrate resin is pink as defined in the CIE LAB color space, and:
$L_{GB}^*$, and $L_{CC}^*$ differ by greater than 11.50 CIE LAB color space coordinate points; and
$a_{GB}^*$, and $a_{CC}^*$ differ by greater than 3 CIE LAB color space coordinate points; and
$b_{GB}^*$, and $b_{CC}^*$ differ by less than 7 CIE LAB color space coordinate points; and
$C_{GB}^*$, and $C_{CC}^*$ differ by up to 15 CIE LAB color space coordinate points; and
$h_{GB}°$, and $h_{CC}°$ differ by less than 7 CIE LAB color space coordinate points.

13. The golf ball of claim 12, wherein the plurality of outer coating layers comprises a first outer coating layer formed about an outer surface of the cover layer; a second outer coating layer formed about an outer surface of the first outer coating layer; and a third outer coating layer formed about an outer surface of the second outer coating layer; wherein the first outer coating layer comprises a clear water-borne or clear solvent-borne primer.

14. The golf ball of claim 13, wherein the second outer coating layer comprises a gold pearl primer and the third outer coating layer comprises a clear topcoat.

15. The golf ball of claim 14, wherein the first outer coating layer and/or the third outer coating layer is colorless.

16. The golf ball of claim 13, wherein the second outer coating layer comprises a white sparkle primer and the third outer coating layer comprises a clear topcoat.

17. The golf ball of claim 16, wherein the first outer coating layer and/or the third outer coating layer is colorless.

18. The golf ball of claim 12, wherein the plurality of outer coating layers comprises a first outer coating layer formed about an outer surface of the cover layer; and a second outer coating layer formed about an outer surface of the first outer coating layer; wherein the first outer coating layer comprises a clear water-borne or clear solvent-borne primer.

19. The golf ball of claim 18, wherein the second outer coating layer comprises a matte topcoat.

20. The golf ball of claim 19, wherein the first outer coating layer and/or the second outer coating layer is colorless.

21. The golf ball of claim 18, wherein the second outer coating layer comprises a clear glossy topcoat.

22. The golf ball of claim 21, wherein the first outer coating layer and/or the second outer coating layer is colorless.

23. A golf ball comprising: a core; a casing layer; a cover layer; and a plurality of outer coating layers;
wherein the casing layer comprises an ionomer blend comprising at least one ionomer and a color concentrate resin; wherein the color concentrate resin is included in an amount of from 3 wt. % to 10 wt. % of the ionomer blend; and wherein the cover layer is transparent;

wherein the golf ball has an overall golf ball color appearance having coordinates $L_{GB}^*$, $a_{GB}^*$, $b_{GB}^*$, $C_{GB}^*$, and $h_{GB}°$ in the CIE LAB color space that are different than coordinates $L_{CC}^*$, $a_{CC}^*$, $b_{CC}^*$, $C_{CC}^*$, and $h_{CC}°$ in the CIE LAB color space of the color concentrate resin; and wherein the color concentrate resin is orange as defined in the CIE LAB color space, and:

$L_{GB}^*$, and $L_{CC}^*$ differ by greater than 6 CIE LAB color space coordinate points; and $a_{GB}^*$, and $a_{CC}^*$ differ by greater than 7 CIE LAB color space coordinate points; and $b_{GB}^*$, and $b_{CC}^*$ differ by greater than 15 CIE LAB color space coordinate points; and $C_{GB}^*$, and $C_{CC}^*$ differ by greater than 15 CIE LAB color space coordinate points; and $h_{GB}°$, and $h_{CC}°$ differ by greater than 9 CIE LAB color space coordinate points.

24. The golf ball of claim 23, wherein the plurality of outer coating layers comprises a first outer coating layer formed about an outer surface of the cover layer; a second outer coating layer formed about an outer surface of the first outer coating layer; and a third outer coating layer formed about an outer surface of the second outer coating layer; wherein the first outer coating layer comprises a clear water-borne or clear solvent-borne primer.

25. The golf ball of claim 24, wherein the second outer coating layer comprises a gold pearl primer and the third outer coating layer comprises a clear topcoat.

26. The golf ball of claim 25, wherein the first outer coating layer and/or the third outer coating layer is colorless.

27. The golf ball of claim 24, wherein the second outer coating layer comprises a white sparkle primer and the third outer coating layer comprises a clear topcoat.

28. The golf ball of claim 27, wherein the first outer coating layer and/or the third outer coating layer is colorless.

29. The golf ball of claim 23, wherein the plurality of outer coating layers comprises a first outer coating layer formed about an outer surface of the cover layer; and a second outer coating layer formed about an outer surface of the first outer coating layer; wherein the first outer coating layer comprises a clear water-borne or clear solvent-borne primer.

30. The golf ball of claim 29, wherein the second outer coating layer comprises a matte topcoat.

31. The golf ball of claim 30, wherein the first outer coating layer and/or the second outer coating layer is colorless.

32. The golf ball of claim 29, wherein the second outer coating layer comprises a clear glossy topcoat.

33. The golf ball of claim 32, wherein the first outer coating layer and/or the second outer coating layer is colorless.

* * * * *